Figure 1:
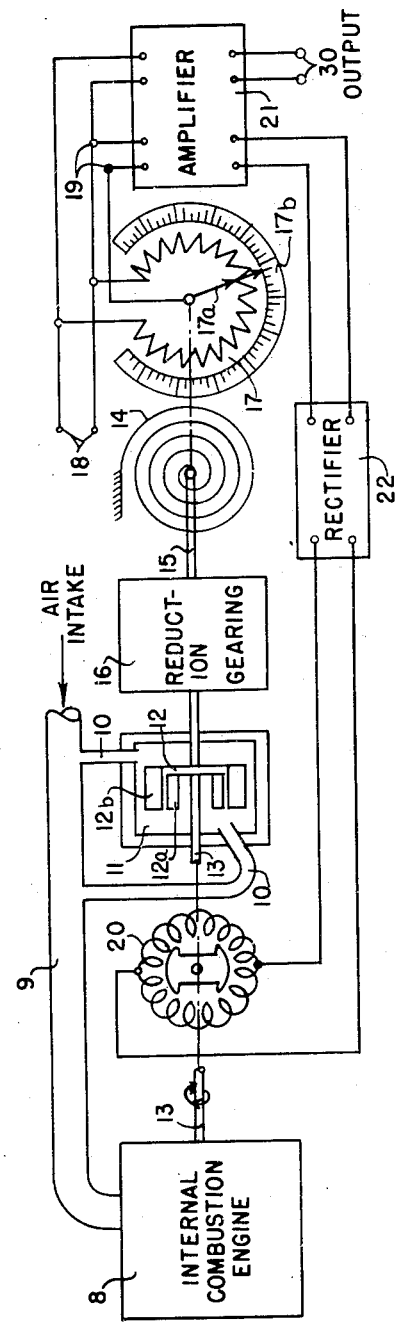

June 7, 1949.   D. W. MOORE, JR   2,472,609
ELASTIC FLUID-FLOW MEASURING SYSTEM
Filed Nov. 8, 1944

INVENTOR.
DAVID W. MOORE JR.
BY Mueller, Dodds & Mason
ATTORNEYS

Patented June 7, 1949

2,472,609

UNITED STATES PATENT OFFICE 2,472,609

ELASTIC FLUID-FLOW MEASURING SYSTEM

David W. Moore, Jr., New York, N. Y., assignor to Fairchild Camera and Instrument Corporation, a corporation of Delaware Application November 8, 1944, Serial No. 562,557

6 Claims. (Cl. 73—194)

This invention relates to an elastic fluid-flow measuring system by means of which there may be obtained a measurement of fluid flow in mass per unit of time independent of variations in temperature, barometric pressure and the like. While the invention is of general application, it is particularly useful in a system for automatically controlling the air and fuel input to an internal combustion engine of the type disclosed and claimed in copending application of Serial No. 562,556, filed November 8, 1944, and assigned to the same assignee as the present application.

In many industrial applications, it becomes necessary or desirable to obtain an accurate measurement of the flow of an elastic fluid, such as air, in weight or mass per unit of time. This measurement is a difficult one because of the number of factors affecting the density of the fluid, and therefore the mass flow, for example, temperature, barometric pressure and the like, and in many installations it is difficult or impossible to obtain reasonably accurate separate measurements of these factors. For example, in the measurement of the air intake to an aircraft engine there has been found no satisfactory means for measuring the manifold air temperature due to the presence of gasoline vapor and, at high manifold pressures, water vapor or droplets. Furthermore, even when these factors are obtainable, such a measuring system involves the addition of more or less complex electrical or mechanical computing systems for combining the several parameters according to a proper formula. Also in the measurement of the velocity of the elastic fluid in order to determine the mass flow per unit of time, use is customarily made of one of various differential-pressure creating devices, such as orifices, Pitot tubes or Venturi constrictions, in which the velocity of the fluid is represented as a fractional power or other non-linear function of the differential pressure, requiring certain calibrating or rectifying devices to obtain the desired linear measurement.

It is an object of the invention, therefore, to provide a new and improved system for measuring the flow of an elastic fluid in a conduit in weight per unit of time in which the density factor involved in such measurement is obtained directly and without the aid of computing apparatus.

It is another object of the invention to provide a new and improved system for measuring the flow of an elastic fluid in a conduit in weight per unit of time by means of which there may be obtained a measurement, for example, an electrical signal, either locally or at a remote point.

In accordance with the invention, a system for measuring the flow of air to an internal combustion engine including an air intake conduit in weight per unit of time, independently of variations in temperature, barometric pressure and the like, comprises a chamber in fluid communication with the conduit, means including rotatable means in said chamber having provisions for driving by the engine for deriving a first effect varying substantially solely with the density and the square of the velocity of the fluid in the conduit and means having provisions for driving by the engine for deriving a second effect varying with the velocity of the fluid in the conduit. The system also includes means responsive jointly to said first and second effects for deriving a third effect representative of the quotient of the first effect by the second effect, constituting a measurement of the fluid flow.

In accordance with a specific embodiment of the invention, a system for measuring the flow of air to an internal combustion engine including an air intake conduit in weight per unit of time, independently of variations in temperature, barometric pressure and the like, comprises a chamber in fluid communication with the conduit, a fluid turbulence device mounted in the chamber and comprising a rotatable impeller and a rotatable runner surrounding the impeller, the impeller having provisions for driving by the engine. The system also includes biasing means for limiting the rotation of the runner, means for deriving a first effect varying with the rotation of the runner against the action of the biasing means, and means having provisions for driving by the engine for deriving a second effect varying with the velocity of the fluid in the conduit. The system also includes means for deriving a third effect representative of the quotient of the first effect by the second effect and constituting a measure of the fluid flow in the conduit. Also in a preferred embodiment of the invention each of the first and second effects is an electrical signal, the first signal being divided by the second signal to derive a third electrical signal which is representative of the fluid flow.

For a better understanding of the invention, together with other and further objects thereof, reference is had to the following description taken in connection with the accompanying drawings, while its scope will be pointed out in the appended claims.

Figure 2:
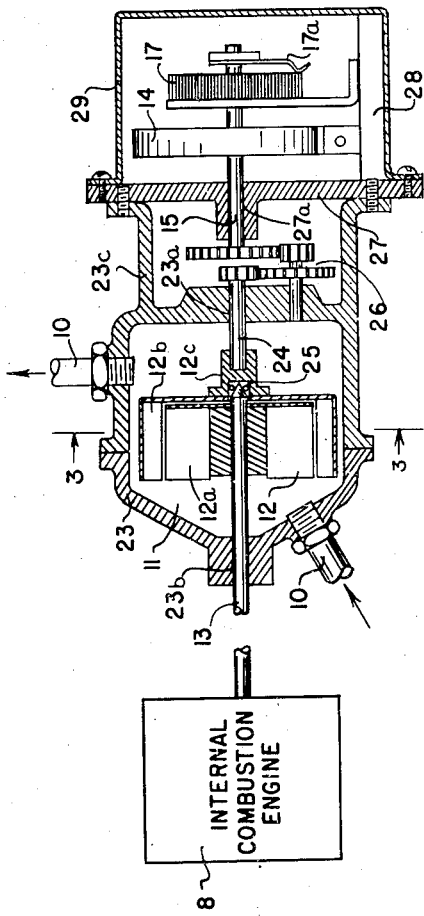
Figure 3:
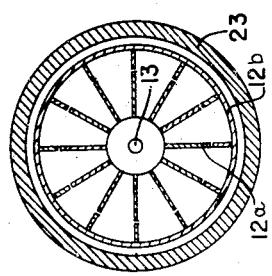

Referring now to the drawings, Fig. 1 is a schematic representation of a complete elastic-fluid flow-measuring system embodying the invention; Fig. 2 is a detailed longitudinal section of a fluid turbulence device, biasing means and voltage divider unit utilized in the system of Fig. 1; while Fig. 3 is a cross-sectional view of such device along the lines 3—3 of Fig. 2.

Referring now to Fig. 1 of the drawings, there is represented schematically a system for measuring the flow of an elastic fluid in a conduit in weight per unit of time independently of variations in temperature, barometric pressure, and the like, for example, for measuring the flow of air to an internal-combustion aircraft engine 8 through its intake manifold or conduit 9. This system includes means in fluid communication with the conduit 9 for deriving a first effect, such as a moment or torque, varying substantially solely with the density and the square of the velocity of the fluid in the conduit. This means comprises a chamber 11 having fluid connections 10, 10 with the conduit 9, preferably constituting a bypass to a portion of the air intake system of the engine, as illustrated. Mounted within the chamber 11 is a fluid turbulence device 12 comprising two relatively rotatable members such as a rotatable impeller 12a surrounded by a rotatable runner 12b. There are provided any suitable means for driving one of the members at a speed representative of the velocity of the fluid in the conduit 9; for example, the impeller 12a may be mounted on a shaft 13 adapted to be driven by the aircraft engine 8 under control, the engine operating as a positive-displacement air pump. With such an arrangement, the runner 12b constitutes a movable means subject to a moment or torque varying with the speed of the engine and, thus, with the flow of fluid in the conduit 9.

The torque developed at the runner 12b is opposed by a biasing means for limiting its rotation, which means may take the form of a spiral spring 14 attached to a shaft 15 driven by the runner 12b through a suitable reduction gearing 16. The system includes means for deriving a first effect varying with and representative of the torque acting on the runner member 12b of the turbulence device 12 and, thus, varying with the rotation of the runner 12b against the action of the biasing spring 14. This derived effect may be of any of several different types, but in the preferred embodiment shown it constitutes an electrical signal obtained from a voltage dividing means 17 having an adjustable contact 17a actuated by the movable means or runner 12b of the device 12 through the gearing 16 and shaft 15. The voltage divider 17 is connected across supply terminals 18 adapted to be energized from a suitable source of alternating-current power, the electrical signal appearing at output terminals 19 individually connected to the adjustable contact 17a and to one of the supply terminals 18. A scale 17b associated with an extension of adjustable contact 17a gives a visual indication of such first effect; that is, of the torque reaction on runner 12b and the electrical signal at terminals 19.

It has been found that the torque developed at the runner 12b and, therefore, the electrical signal developed at the output terminals 19 of voltage divider 17 are represented by the equation:

$$E = k\rho v^2$$

where
E = Derived effect, for example, the electrical signal
k = A constant
$\rho$ = Elastic fluid density
v = Fluid velocity On the other hand the fluid mass flow is represented by the expression $k\rho v$. Therefore it becomes necessary to divide the effect derived by the turbulence device 12 by the fluid velocity to get a torque representative of the fluid flow. To this end, the system includes means for deriving a second effect varying with the velocity of the fluid in the conduit, this means being in the form of a small permanent-magnet alternating-current generator 20 having a permanent magnet rotor mounted on the shaft 13 for driving by the engine so that the generated alternating current constitutes a second electrical signal varying with the velocity of the fluid in the conduit. Alternatively the second electrical signal or other effect representative of the velocity of the fluid may be developed by the speed-responsive systems described and claimed in either of my copending applications entitled "Speed-Responsive system," Serial No. 562,559, filed November 8, 1944, and now abandoned, or Serial No. 563,922, filed November 17, 1944, and now Patent Number 2,433,327, dated December 9, 1947, and assigned to the same assignee as the present application.

In order to combine the first and second effects or signals, there is provided means for deriving a third effect representative of the quotient of the first effect by the second effect; that is, the resultant from dividing the first electrical signal by the second signal to derive a third electrical signal. This means comprises an amplifier 21 to which the first electrical signal is applied from the output terminals 19 of the voltage divider 17. The power supply for the amplifier 21 is derived from the input terminals 18 as illustrated. The alternating-current signal generated by the device 20 is applied to a rectifier 22, the output of which is applied as a negative bias to the amplifier 21, thus controlling the gain of the amplifier 21 inversely in accordance with the alternating-current signal developed by the device 20. The amplifier 21 is provided with output terminals from which the third electrical signal is derived.

A detailed view of one form of apparatus suitable for use in the system of Fig. 1 is shown in Figs. 2 and 3 in which elements corresponding to the elements of Fig. 1 are identified by the same reference numerals. From these views it is seen that the chamber 11 is provided in a housing 23. At diagonally opposite corners thereof are disposed the inlet and outlet conduits 10. The runner 12b is mounted on a hub 12c which is in turn disposed on a stub shaft 24 mounted in a bearing 23a in one end of the casing 23. The impeller 12a is mounted on the shaft 13 extending through a bearing 23b in the other end of the casing 23 and terminating in an anti-friction bearing 25 in the end of the hub 12c. The bearings 23a and 23b are shown schematically for the sake of simplicity but will ordinarily comprise conventional anti-friction bearings and shaft seals. The stub shaft 24 drives the secondary shaft 15 through reduction gearing 26. The secondary shaft 15 is disposed in a bearing 27a in an end plate 27 closing an annular extension 23c of the housing 23. Mounted on the over-hanging portion of the shaft 15 are the biasing spring 14 and the adjustable contact 17a of the voltage divider 17, the end of the spring 14 and the voltage divider 17 being mounted on a bracket 28 secured to the end plate 27 and being enclosed within a suitable casing or housing 29.

The operation of the system illustrated will be apparent to those skilled in the art from the foregoing description. In brief, however, during the operation of the aircraft engine to which the fluid-flow measuring system is applied, the required air either passes through the chamber 11 by way of conduits 10, 10 or the chamber 11 is mounted adjacent to the intake manifold or super-charger collector ring of the aircraft engine in such a way that a circulation of input air is maintained through the chamber 11. The shaft 13 is driven by the engine and rotates the impeller 12a of the turbulence device 12 at a speed which is representative of the velocity of the air intake to the engine. The relationship between the engine speed and the air velocity is substantially linear, since the engine operates as the equivalent of a positive-displacement pump insofar as the air intake is concerned. The turbulence device 12 including the impeller 12a and runner 12b acts effectively as a fluid clutch and operates on the same principle as the familiar fluid-automobile clutch.

The torque developed on the runner 12b acts against the opposing biasing spring 14 through the reduction gearing 16, rotating the shaft 15 and adjusting the contact 17a of voltage divider 17 by an amount proportional to such torque. The electrical signal at the output terminals 19 of the voltage divider 17 therefore constitutes an effect varying substantially solely with the density and the square of the velocity of the fluid in the conduit.

However, as stated above, the desired measurement includes the first power of the velocity factor and it becomes necessary to divide the first effect or electrical signal by a factor representative of the fluid velocity. This operation is effected by the generator 20 which develops an electrical signal varying linearly with the engine speed and, therefore, with fluid velocity. This alternating current signal is rectified in the unit 22 and is applied as a negative bias to the amplifier 21 to which the first electrical signal 19 is also applied. It is apparent that the gain of the amplifier 21, so long as it is working on the linear portion of its characteristic, varies inversely in accordance with the negative bias applied thereto by the rectifier 22. Therefore, if the speed of the engine and the velocity of the fluid are doubled, the negative bias applied to the amplifier 21 is also doubled so that the gain of the amplifier 21 is halved; that is, the first electrical signal at the terminals 19 derived from the voltage divider 17 is effectively divided by the second electrical signal developed by the generator 20. However, the doubling of the engine speed increases the signal at terminals 19 by four times so that the output signal appearing at the terminals 30 is doubled and constitutes an absolute measure of the air mass flow to the engine.

Thus it is seen that the fluid flow measuring system described involves the direct measurement of only two quantities. The reaction torque on the turbulence device $k\rho v^2$ and the velocity of the fluid in the conduit $v$ thus avoiding the independent measurement of the fluid density temperature barometric pressure and the like and the elaborate computing mechanism required for combining these parameters in a proper formula. By the use of this system also involving the operation of the engine as a positive-displacement air pump together with fluid turbulence device 12 there is avoided the use of any obstruction to the flow of air to the engine such as orifice, Pitot tubes or Venturi constrictions, which obstructions tend to reduce the pressure drop in the engine manifold and reduce the maximum power output particularly at higher altitudes.

While there has been described what is at present considered to be the preferred embodiment of the invention, it will be apparent to those skilled in the art that various changes and modifications may be made therein without departing from the spirit or scope of the invention.

What is claimed as new is:

1. A system for measuring the flow of air to an internal combustion engine including an air intake conduit in weight per unit of time independently of variations in temperature, barometric pressure, and the like comprising, a chamber in fluid communication with said conduit, means including rotatable means in said chamber having provisions for driving by the engine for deriving a first effect varying substantially solely with the density and the square of the velocity of said fluid in said conduit, means having provisions for driving by the engine for deriving a second effect varying with the velocity of said fluid in said conduit, and means responsive jointly to said first and second effects for deriving a third effect representative of the quotient of said first effect by said second effect, constituting a measure of said fluid flow.

2. A system for measuring the flow of an elastic fluid in a conduit in weight per unit of time independently of variations in temperature, barometric pressure, and the like comprising, a chamber having a fluid connection with said conduit, a fluid turbulence device comprising relatively rotatable members mounted in said chamber, means for driving one of said members at a speed representative of the velocity of said fluid in said conduit, means for deriving a first effect representative of the torque reaction of the other of said members, means for deriving a second effect varying with the velocity of said fluid in said conduit, and means responsive jointly to said first and second effects for deriving a third effect representative of the quotient of said first effect by said second effect, constituting a measure of said fluid flow.

3. A system for measuring the flow of an elastic fluid in a conduit in weight per unit of time independently of variations in temperature, barometric pressure, and the like comprising, a chamber having a fluid connection with said conduit, a fluid turbulence device mounted in said chamber and comprising a rotatable impeller and a rotatable runner surrounding said impeller, biasing means for limiting the rotation of said runner, means for driving said impeller at a speed representative of the velocity of said fluid in said conduit, means for deriving a first effect representative of the torque reaction of said runner, means for deriving a second effect varying with the velocity of said fluid in said conduit, and means responsive jointly to said first and second effects for deriving a third effect representative of the quotient of said first effect by said second effect, constituting a measure of said fluid flow.

4. A system for measuring the flow of an elastice fluid in a conduit in weight per unit of time independently of variations in temperature, barometric pressure, and the like comprising, a chamber having a fluid connection with said conduit, a fluid turbulence device mounted in said chamber and comprising a rotatable impeller and a rotatable runner surrounding said impeller, biasing means for limiting the rotation of said runner, means for driving said impeller at a speed representative of the velocity of said fluid in said conduit, means for deriving a first effect varying with the rotation of said runner against the action of said biasing means, means for deriving a second effect varying with the velocity of said fluid in said conduit, and means responsive jointly to said first and second effects for deriving a third effect representative of the quotient of said first effect by said second effect, constituting a measure of said fluid flow.

5. A system for measuring the flow of air to an internal combustion engine including an air intake conduit in weight per unit of time independently of variations in temperature, barometric pressure, and the like comprising, a chamber in fluid connection with said conduit, a fluid turbulence device mounted in said chamber and comprising a rotatable impeller and a rotatable runner surrounding said impeller, biasing means for limiting rotation of said runner, said impeller having provisions for driving by the engine, means for deriving a first effect varying with the rotation of said runner against the action of said biasing means, means having provisions for driving by the engine for deriving a second effect varying with the velocity of said fluid in said conduit, and means responsive jointly to said first and second effects for deriving a third effect representative of the quotient of said first effect by said second effect, constituting a measure of said fluid flow.

6. A system for measuring the flow of an elastic fluid in a conduit in weight per unit of time independently of variations in temperature, barometric pressure, and the like comprising, a chamber having a fluid connection with said conduit, a fluid turbulence device mounted in said chamber and comprising a rotatable impeller and a rotatable runner surrounding said impeller, biasing means for limiting rotation of said runner, means for driving said impeller at a speed representative of the velocity of said fluid in said conduit, voltage dividing means having an adjustable element actuated by said runner for deriving a first electrical signal, means for deriving a second electrical signal varying with the velocity of said fluid in said conduit, and means responsive jointly to said first and second signals for dividing said first signal by said second signal to derive a third electrical signal constituting a measure of said fluid flow.

DAVID W. MOORE, Jr.

REFERENCES CITED

The following references are of record in the file of this patent:

UNITED STATES PATENTS

| Number | Name | Date |
|---|---|---|
| 720,188 | Seidener | Feb. 10, 1903 |
| 1,533,530 | Wheatley et al. | Apr. 14, 1925 |
| 2,009,711 | Mateer | July 30, 1935 |